(12) United States Patent
Margolin et al.

(10) Patent No.: US 12,216,717 B1
(45) Date of Patent: Feb. 4, 2025

(54) METHODS AND SYSTEMS FOR IMPLEMENTING LARGE LANGUAGE MODELS AND SMART CACHING WITH ZERO SHOT

(71) Applicant: INTUIT INC., Mountain View, CA (US)

(72) Inventors: Itay Margolin, Tel Aviv (IL); Eilon Sheetrit, Tel Aviv (IL); Ido Joseph Farhi, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/611,549

(22) Filed: Mar. 20, 2024

(51) Int. Cl.
*G06F 16/93* (2019.01)
*G06F 12/0875* (2016.01)

(52) U.S. Cl.
CPC .......... *G06F 16/93* (2019.01); *G06F 12/0875* (2013.01)

(58) Field of Classification Search
CPC .............................. G06F 16/93; G06F 12/0875
See application file for complete search history.

(56) References Cited

U.S. PATENT DOCUMENTS

| 2021/0182328 A1* | 6/2021 | Rollings | ................. G06F 40/30 |
| 2021/0182343 A1* | 6/2021 | Li | ......................... G06F 18/214 |

* cited by examiner

*Primary Examiner* — Hau H Hoang
(74) *Attorney, Agent, or Firm* — DLA Piper LLP US (57) ABSTRACT

A Large Language Model (LLM) for classifying documents by identifying indicators within the documents. A smart caching mechanism stores document classifications and associated indicators output from the LLM. The database contains document details, classifications, and associated indicators. A classification module classifies a new document by analyzing it for indicators, checking the cache for a match, and querying the database for the indicators if no match is found. The module applies a majority vote based on the classifications associated with the indicators.

20 Claims, 8 Drawing Sheets

METHODS AND SYSTEMS FOR IMPLEMENTING LARGE LANGUAGE MODELS AND SMART CACHING WITH ZERO SHOT

BACKGROUND

The field of document classification has seen a surge in advancements with the advent of machine learning and natural language processing techniques. Large Language Models (LLMs), such as transformer-based models, have been particularly instrumental in this regard. These models are capable of understanding and generating human-like text, making them ideal for tasks such as document classification. LLMs classify documents by identifying indicators or keywords in the documents, which are then used to determine the appropriate classification. This process, however, can be computationally expensive and time-consuming, especially for long documents, which is undesirable.

SUMMARY

Embodiments disclosed herein solve the aforementioned technical problems and may provide other technical solutions as well. Contrary to conventional techniques, the disclosed principles are distinct from the state of the art in that they do not rely on document similarity for classification, but instead use a smart caching mechanism and a database of indicators identified by the LLM; this enables efficient classification of new documents by checking for these indicators in the cache and the database, and applying a majority vote based on the classifications associated with these indicators, thereby reducing the computational cost and time associated with LLM calls.

An example embodiment includes a document classification system, comprising an LLM configured to classify documents by identifying indicators in the documents, a smart caching mechanism configured to store classifications of documents and associated indicators from the LLM, a database containing document details, classifications, and associated indicators, and a classification module configured to classify a new document by analyzing the new document for indicators and checking for a match in the cache based on the indicators, querying the database for these indicators when no match for the new document is found in the cache, and applying a majority vote based on the classifications associated with these indicators.

Another example embodiment includes a document classification method, comprising classifying, by an LLM, documents by identifying indicators in the documents, storing, by a smart caching mechanism, classifications of documents and associated indicators from the LLM, storing, by a database, document details, classifications, and associated indicators, and classifying, by a classification module, a new document by analyzing the new document for indicators and checking for a match in the cache based on the indicators, querying the database for these indicators when no match for the new document is found in the cache, and applying a majority vote based on the classifications associated with these indicators.

BRIEF DESCRIPTION OF THE DRAWINGS

So that the way the above-recited features of the present disclosure can be understood in detail, a more particular description of the disclosure, briefly summarized above, may be made by reference to example embodiments, some of which are illustrated in the appended drawings. It is to be noted, however, that the appended drawings illustrate only example embodiments of this disclosure and are therefore not to be considered limiting of its scope, for the disclosure may admit to other equally effective example embodiments.

DETAILED DESCRIPTION

Various example embodiments of the present disclosure will now be described in detail with reference to the drawings. It should be noted that the relative arrangement of the components and steps, the numerical expressions, and the numerical values set forth in these example embodiments do not limit the scope of the present disclosure unless it is specifically stated otherwise. The following description of at least one example embodiment is merely illustrative in nature and is in no way intended to limit the disclosure, its application, or its uses. Techniques, methods, and apparatuses as known by one of ordinary skill in the relevant art may not be described in detail but are intended to be part of the specification where appropriate. In all of the examples illustrated and discussed herein, any specific values should be interpreted to be illustrative and non-limiting. Thus, other example embodiments may have different values. It is noted that similar reference numerals and letters refer to similar items in the figures, and once an item is defined for one figure, it is possible that it need not be further discussed for the other figures. The present disclosure relates to a document classification system and method, specifically designed to leverage LLMs for efficient and cost-effective document classification. The system and method may employ a smart caching mechanism and a database of document details, classifications, and associated indicators to minimize the number of calls to the LLM.

The disclosed system and methods offer a novel approach to document classification, addressing the challenges of time and resource consumption associated with the use of LLMs for classifying long documents. By intelligently caching LLM responses and utilizing a database of indicators for classification, the system reduces the reliance on LLM calls, thereby enhancing classification efficiency and reducing costs. Furthermore, the system and method's ability to identify and use known indicators from a document for classification provides a robust and flexible solution for document classification tasks.

The disclosed principles are now briefly summarized with the following example. Consider a large organization with a vast number of documents that require classification. These documents could be customer complaints, legal documents, tax documents or any other type of document that the organization deals with. The organization has been using an LLM to classify these documents, but the process is time-consuming and expensive due to the large volume of documents. By implementing the disclosed system and methods, the organization can efficiently classify new documents by checking for a match in the cache based on indicators, querying the database for these indicators when no match is found, and applying a majority vote based on the classifications associated with these indicators. The LLM may be queried to perform classifications in cases where a majority vote cannot be determined. This results in a more efficient and cost-effective document classification process for the organization where LLM classification queries are reduced or even eliminated.

As the LLM performs more classifications, the database of indicators becomes increasingly enriched. Each classification process identifies specific indicators within a document, which are then stored in the database along with the corresponding classification. This enrichment of the database enhances the system and methods' ability to classify new documents based on these stored indicators. Over time, as the database becomes more enriched with a diverse range of indicators from various classifications, the system may even be able to further reduce LLM calls or eliminate them altogether, relying entirely on the enriched database for document classification.

Figure 1:
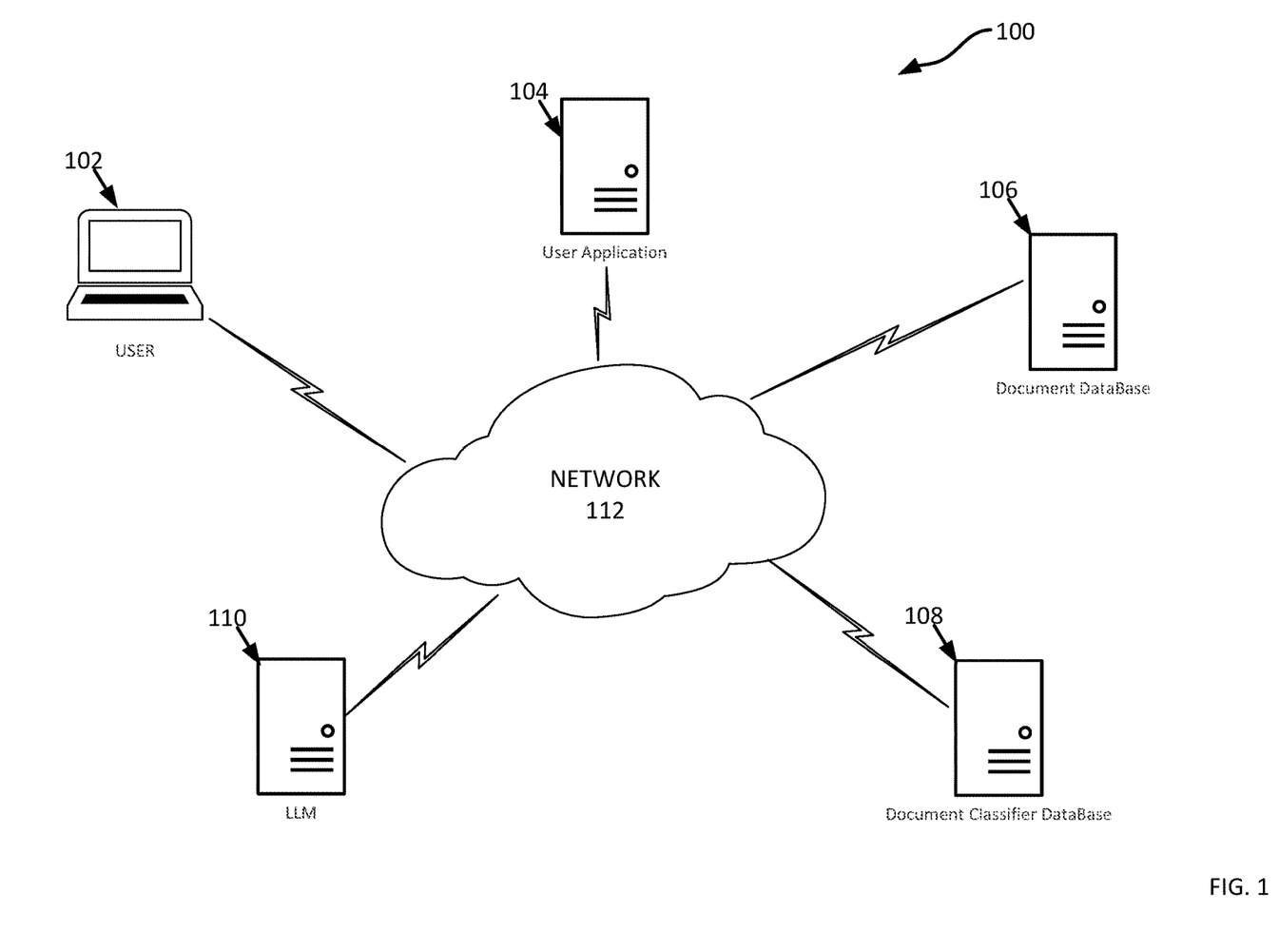
FIG. 1 illustrates a block diagram of an example document classification system, according to aspects of the present disclosure.

Referring to FIG. 1, a block diagram illustrates an example of the document classification system 100, according to the disclosed principles. The system 100 may include a user interface device 102, which may be any device capable of receiving user inputs and displaying information to the user. The user interface device 102 interacts with a user application server 104, which may be a server or a computing device running an application for document classification.

In some aspects, the user application server 104 connects to a document storage database 106 and a classification data database 108 through a network 112. The document storage database 106 may store a variety of documents that require classification. In some cases, the document storage database 106 may be a relational database management system (RDBMS), which organizes data into tables and allows for efficient querying and retrieval of data. In other examples, database 106 may be a non-relational database (NoSQL) which can store data in a variety of formats including document-oriented, column-oriented, graph-based, or based on a flexible schema. This flexibility can be advantageous in the context of the disclosed system, as it allows for efficient storage and retrieval of diverse and complex data associated with document classification.

The classification data database 108 depicted in FIG. 1, stores classifications of documents and associated indicators. In some examples, the classification data database 108 may utilize a smart caching mechanism to store classifications of documents and associated indicators in a hash table. This allows for efficient retrieval of classification data when classifying new documents.

The LLM server 110, also connected to the network 112, plays a role in processing and classifying documents. In some cases, the LLM server 110 may utilize a transformer-based model for document classification. This model may be capable of identifying indicators in the documents, which are used for classification.

In one example, the interaction between the devices in FIG. 1 may be as follows. User interface device 102 receives a document for classification and communicates this to the user application server 104. The user application server 104, in turn, checks the smart caching mechanism in the classification data database 108 to see if the document or its indicators have been previously classified. If a match is found, the classification is retrieved, and the process ends. If no match is found, the server 104 identifies the document's indicators and queries the classification data database 108 for these indicators. The database 108 returns the classifications associated with these indicators. The server 104 applies a majority vote based on these classifications to classify the document. In the event of a tie or if no indicators are found, the server 104 sends a request to the LLM server 110 to classify the document. Once the LLM server 110 classifies the document and identifies the indicators, this information is stored in the classification data database 108 for future use. This interaction between the devices allows for efficient document classification while minimizing the number of calls to the LLM server 110. As can be appreciated, this is just one example, and other sequences of interactions are possible.

It is to be understood that the components of the system 100 as depicted in FIG. 1 are merely illustrative and variations to these components are possible. For example, the user interface device 102, user application server 104, document storage database 106, classification data database 108, and LLM server 110 may be implemented in various configurations and using various technologies, depending on the specific requirements of the document classification system.

Figure 2A:
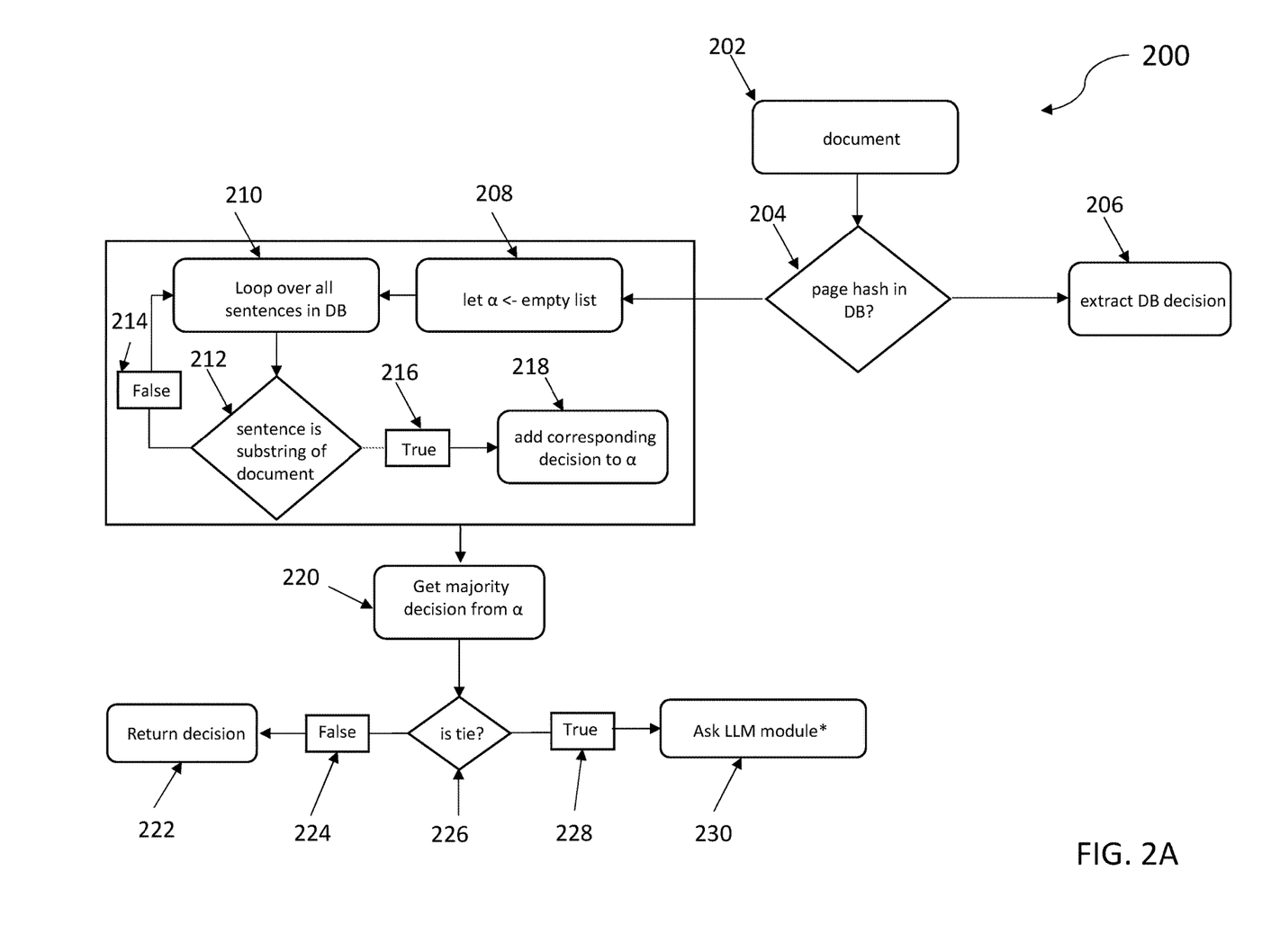
FIG. 2A depicts a flowchart of an example operation of the classification system, according to aspects of the present disclosure.

Referring to FIG. 2A, a classification system flowchart illustrates an example of the document classification process 200, according to the disclosed principles. The process 200 begins with an input document 202, which may be any document that requires classification. In some aspects, the input document 202 may be a text document, a PDF file, a Word document, or any other type of document that can be processed by the system.

The input document 202 is first processed to determine if its hash exists in a database through a database hash check and decision step 204. The hash of the document may be a cryptographic hash, which is a fixed-size numerical or alphanumeric value computed from the content of the document. In some cases, the hash may be computed using a hash function such as MD5, SHA-1, or SHA-256. If the hash of the input document 202 is found in the database (i.e., a Yes in the database hash check and decision step 204), a database decision extraction step 206 retrieves the classification associated with the hash. This classification may be a category or label that has been previously assigned to the document by the LLM.

If the hash of the input document 202 is not found in the database (i.e., a No in the database hash check and decision step 204), an empty list initialization step 208 is performed. This list may be used to store potential classifications for the document. Following the list initialization, a database sentences loop 210 is performed. During this loop, each sentence in the input document 202 is checked against the database through a substring check decision step 212. In some cases, the substring check may involve checking for a partial match, a semantic match, or a syntactic match between the sentence and the documents in the database. In other words, it checks if a sentence or a portion of a sentence from the input document 202 appears verbatim in any of the classified documents. This substring check is a form of direct text matching, which can be particularly effective in identifying recurring phrases or sentences that are indicative of a specific classification. For instance, if a sentence from the input document 202 matches a sentence in a previously classified document, it can be inferred that the input document is likely to belong to the same class. This inference is based on the assumption that similar sentences are likely to appear in documents of the same class. Therefore, the substring check serves as a quick and efficient way to leverage previously classified documents to classify new documents. It is noted that the substring check decision step 212 may involve checking for an exact match, a partial match, a semantic match, or a syntactic match between the sentence in the new document and the documents in the database.

If a sentence from the input document 202 is not a substring of a document in the database (i.e., a No at step 212), the process 200 follows a false condition path 214 and continues at step 210. If a sentence from the input document 202 is a substring of a document in the database (i.e., a Yes at step 212), the process 200 follows a true condition path 216, and the corresponding classification of the document in the database is added to the list at step 218. This list of potential classifications may be used to classify the input document 202.

Once all sentences in the input document 202 have been checked, a majority decision determination is made at step 220. This determination may involve counting the frequency of each classification in the list and determining the classification with the majority frequency. If there is no tie in the decisions (i.e., a No at tie check decision 226), the process 200 continues to a False tie condition path 224 and the final decision return step 222 provides the classification of the input document 202. If there is a tie (i.e., a Yes at tie check decision 226), the process 200 continues to a tie condition path 228, which leads to an LLM module query step 230 for classification of the input document 202.

In some aspects, the LLM module query 230 may involve sending a query to the LLM to classify the input document 202 and identify the indicators in the document that justify the classification. The LLM may be a transformer-based model capable of classifying documents based on their content. The classification provided by the LLM may be used as the final classification of the input document 202.

It is to be understood that the steps and decisions depicted in the process 200 are merely illustrative and variations to these steps and decisions are possible. For example, the steps of checking for a hash match, initializing an empty list, performing a database sentences loop, checking for a substring match, adding a decision to the list, determining a majority decision, and querying the LLM for classification may be performed in various orders, concurrently, or in a loop, depending on the specific requirements of the document classification system.

Figure 2B:
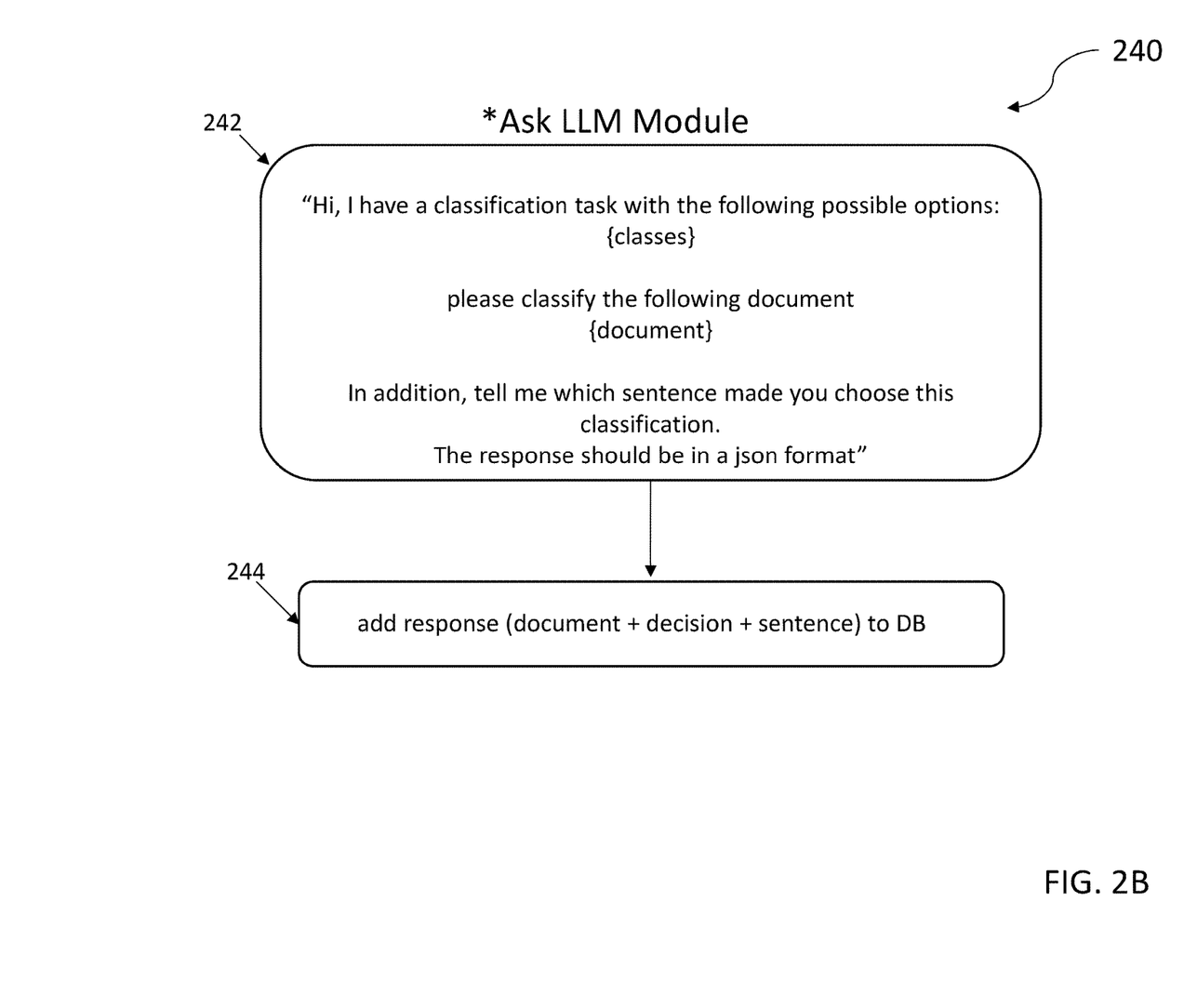
FIG. 2B depicts an example request to the LLM of FIG. 1, according to aspects of the present disclosure.

Referring to FIG. 2B, a flowchart outlines the process 240 of a document classification request to the LLM when the system cannot perform the classification based on the database indicators. The process 240 begins with an LLM classification request 242. In some aspects, the classification module (e.g., software executing on LLM server 110) may initiate the LLM classification request 242 by sending a query to classify a document and identify the indicators or the keywords in the document that justify the classification. The query may be in the form of a natural language prompt listing the identity of the new document and a list of possible classifications. This allows the LLM to understand the context of the document and make an informed decision about its classification. Following the classification by the LLM, a database update step 244 is performed. In some cases, the database update action step 244 involves adding the document, along with the decision and the indicators, to the database. This database may be the classification data database 108 as described in FIG. 1. The database update action step 244 enriches the database with new information, which can be used for future document classification tasks. This sequence illustrates the interaction between the classification request to the LLM and the subsequent update of the database.

It is to be understood that the steps depicted in the flowchart 240 are merely illustrative and variations to these steps are possible. For example, the LLM classification request step 242 and the database update action step 244 may be performed in various orders, concurrently, or in a loop, depending on the specific requirements of the document classification system. Furthermore, the LLM classification request step 242 may involve different types of queries, and the database update action step 244 may involve different types of database operations, depending on the specific implementation of the system.

Figure 3A:
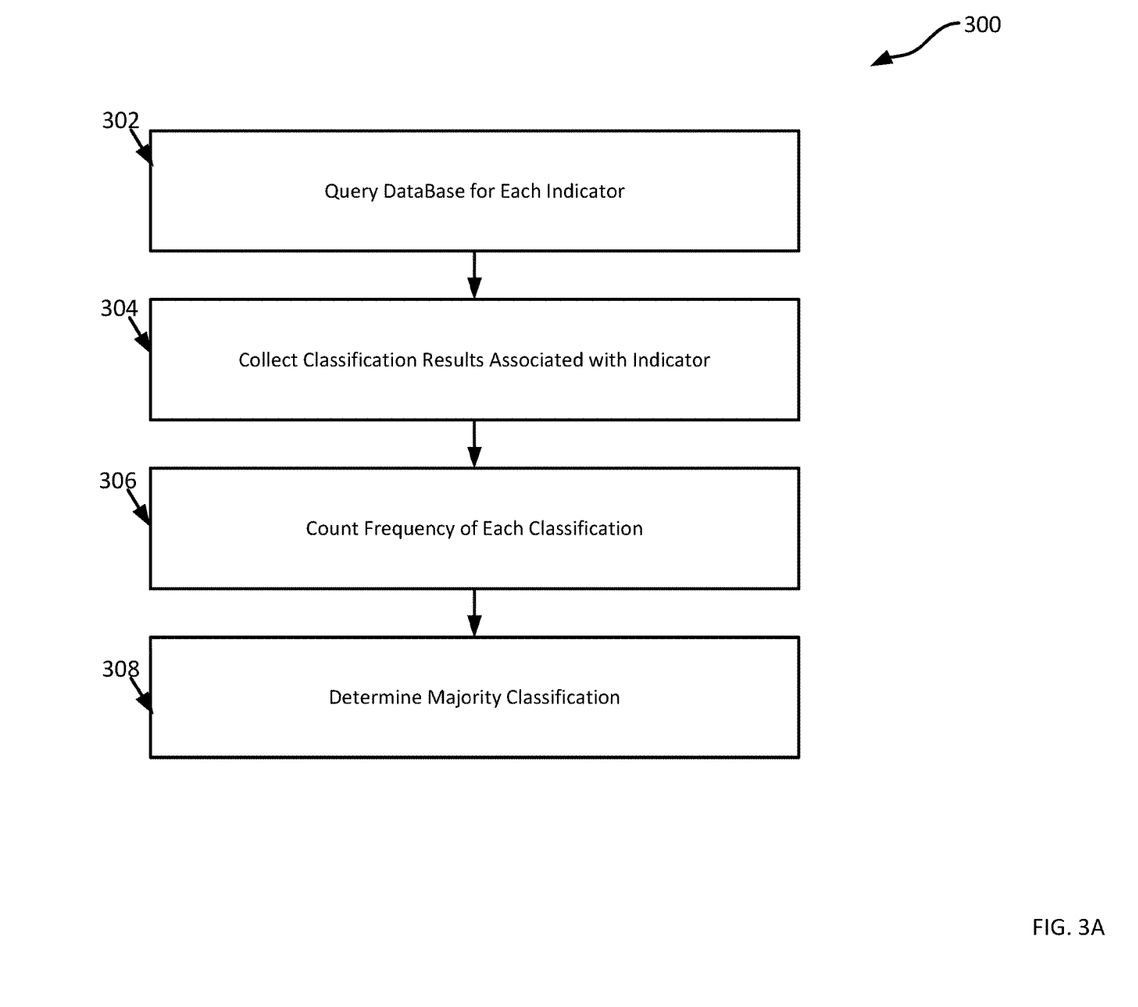
FIG. 3A depicts an example process for document classification, according to aspects of the present disclosure.

Referring to FIG. 3A, a flowchart outlines an example document classification process according to the disclosed principles. The process 300 begins with an indicator query process 302, where the database is queried for each indicator in the new document. In some aspects, the indicator query process 302 may involve querying the classification data database 108 as described in FIG. 1. The database may be queried for each indicator in the new document, which may be any document that requires classification. The indicators may be keywords or phrases in the document that are relevant for classification.

The classification results collection step 304 gathers the classification results associated with each indicator. In some cases, the classification results collection step 304 may involve retrieving the classifications of documents in the database that contain the same indicators as the new document. These classifications may be categories or labels that have been previously assigned to the documents by the LLM.

The classification frequency counter step 306 counts the frequency of each classification obtained. In some aspects, the classification frequency counter step 306 may involve counting the number of times each classification appears in the list of classifications associated with the indicators. This count may be used to determine the frequency of each classification, which may be used to determine the majority classification.

The majority classification determination step 308 determines the majority classification based on the counted frequencies. In some cases, the majority classification determination step 308 may involve determining the classification with the majority frequency as the final classification of the new document. If there is a tie in the majority decision, the classification module may query the LLM for classification of the new document, as described in FIG. 2A.

It is to be understood that the steps depicted in the process 300 are merely illustrative and variations to these steps are possible. For example, the indicator query process 302, classification results collection step 304, classification frequency counter step 306, and majority classification determination step 308 may be performed in various orders, concurrently, or in a loop, depending on the specific requirements of the document classification system. Furthermore, the indicator query process 302 may involve different types of queries, the classification results collection step 304 may involve different methods of gathering classification results, the classification frequency counter step 306 may involve different methods of counting frequencies, and the majority classification determination step 308 may involve different methods of determining the majority classification, depending on the specific implementation of the system.

Figure 3B:
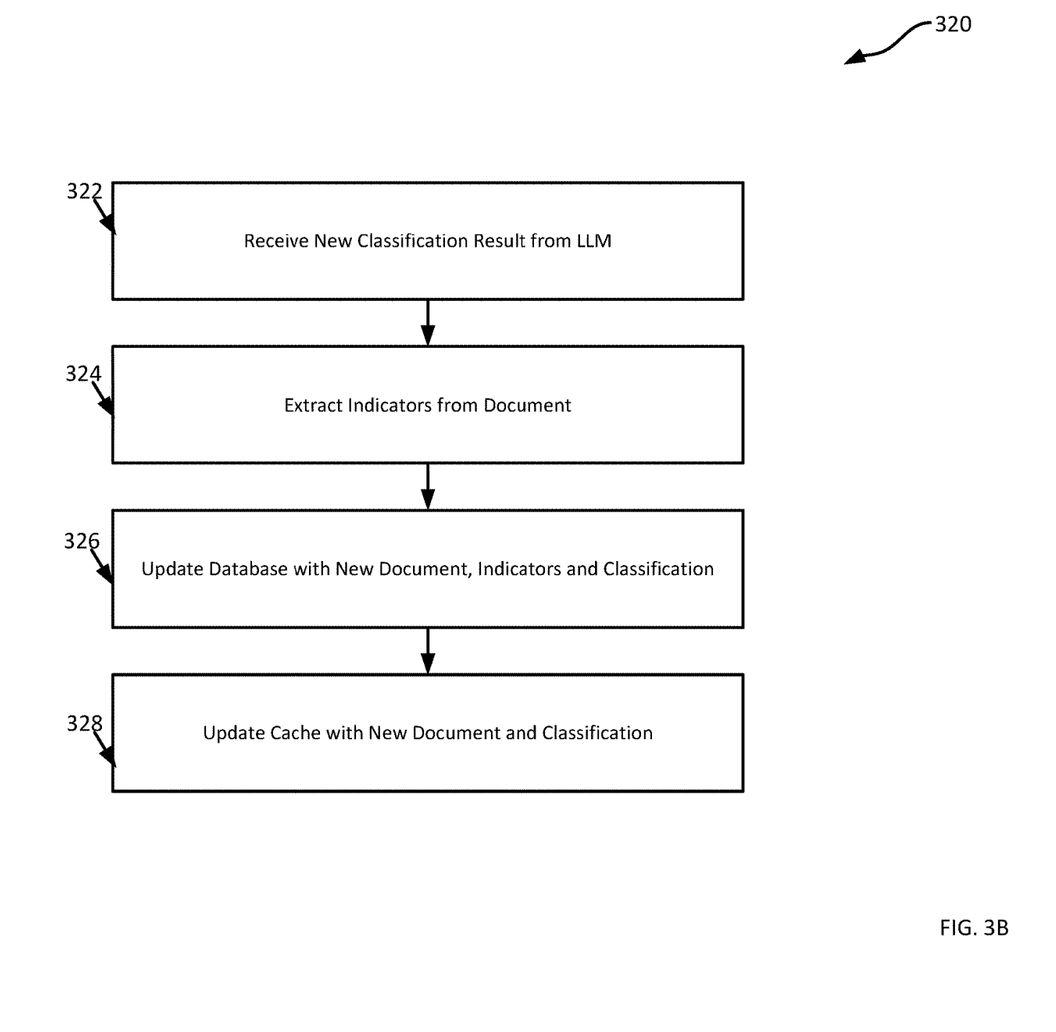
FIG. 3B depicts an example process for document classification and caching, according to aspects of the present disclosure.

Referring to FIG. 3B, a flowchart outlines an example process 320 for document classification and caching in accordance with the disclosed principles. The process 320 begins with a classification result reception step 322, where a new classification result from a LLM is received. In some aspects, the classification result may be a category or label that has been assigned to a document by the LLM. The classification result may be based on the content of the document, including the indicators or keywords in the document that are relevant for classification.

An indicator extraction step 324 extracts indicators from the document. The indicators may be keywords or phrases in the document that are relevant for classification. The extraction of indicators may involve various techniques or algorithms, depending on the specific implementation of the system.

A database update step 326 updates the database with the new document, indicators, and classification. In some aspects, the database update step 326 involves adding the document, along with the indicators and the classification, to the database. This database may be the classification data database 108 as described in FIG. 1. The database update step 326 enriches the database with new information, which can be used for future document classification tasks.

The process 320 may conclude with a cache update step 328, where the cache is updated with the new document and classification. In some cases, the cache update step 328 involves storing the classification of the document and the associated indicators in a cache. The cache may be a smart caching mechanism that stores classifications of documents and associated indicators in a hash table. This allows for efficient retrieval of classification data when classifying new documents.

It is to be understood that the steps depicted in the process 320 are merely illustrative and variations to these steps are possible. For example, the classification result reception step 322, indicator extraction step 324, database update step 326, and cache update step 328 may be performed in various orders, concurrently, or in a loop, depending on the specific requirements of the document classification system. Furthermore, the classification result reception step 322 may involve different types of classification results, the indicator extraction step 324 may involve different methods of extracting indicators, the database update step 326 may involve different types of database operations, and the cache update step 328 may involve different methods of updating the cache, depending on the specific implementation of the system.

Figure 3C:
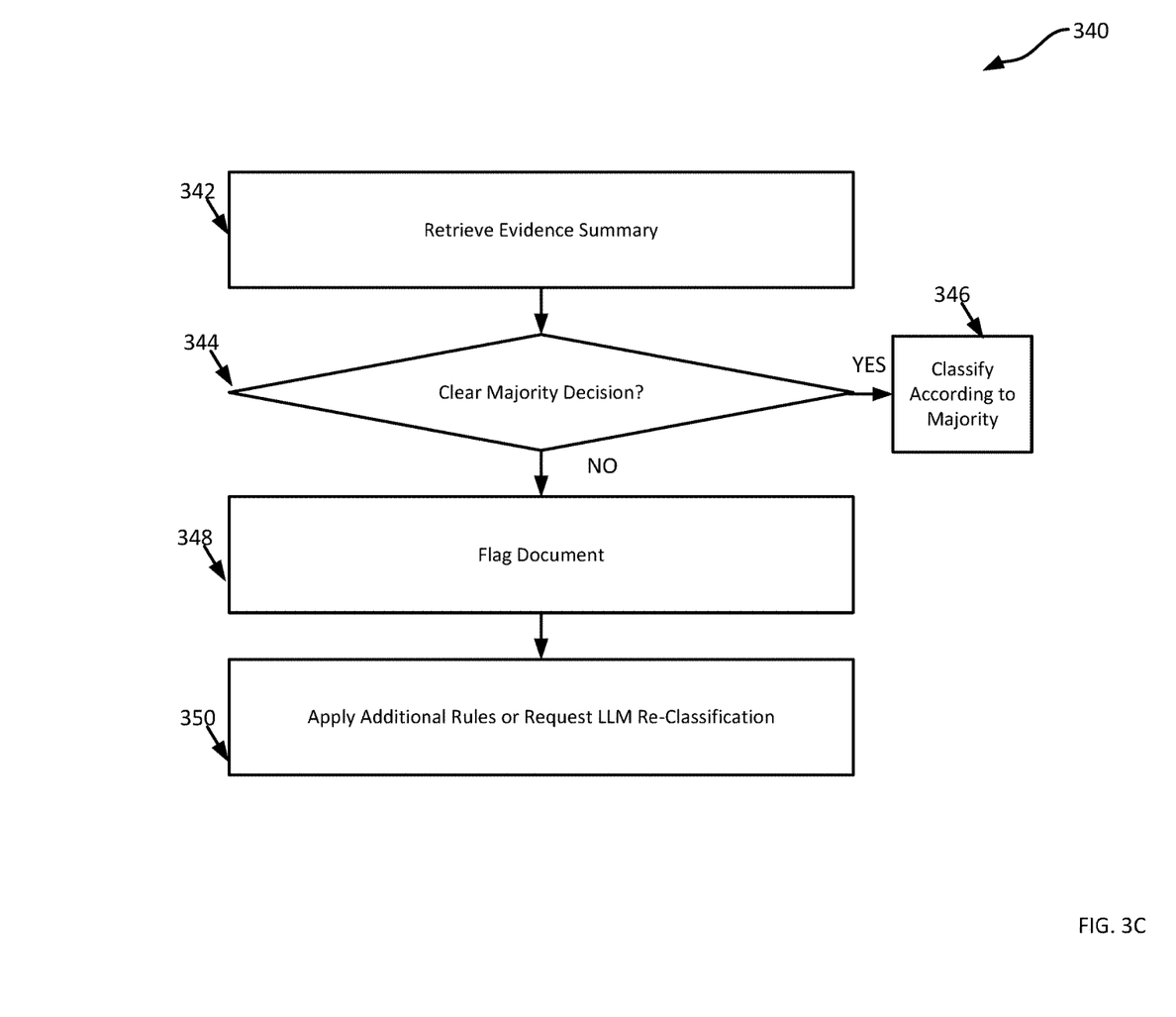
FIG. 3C depicts an example process for document classification and re-classification, according to aspects of the present disclosure.

Referring to FIG. 3C, a flowchart outlines an example decision-making process 340 for document classification. The process 340 begins with an evidence retrieval step 342, where a summary of evidence is retrieved. In some aspects, the evidence may be a list of potential classifications for a document, which are obtained from the database based on the indicators in the document. The evidence may also include the frequency of each classification in the list, which is used to determine the majority classification.

A majority decision check step 344 is performed to determine if there is a clear majority decision. In some cases, the majority decision check step 344 may involve counting the frequency of each classification in the list and determining the classification with the majority frequency. If there is a clear majority (i.e., a Yes at step 344), the document is classified according to the majority in the majority classification step 346. In some aspects, the majority classification step 346 may involve assigning the majority classification to the document as its final classification.

If it is determined that there is no clear majority in the majority decision check step 344 (i.e., a No at step 344), the document is flagged in the document flagging step 348. In some cases, the document flagging step 348 may involve marking the document for further review or re-classification. This may be useful in cases where the indicators in the document do not clearly point towards a single class, or where the indicators point towards a class that is not the correct one.

The process concludes with the additional rules or LLM request step 350, where additional rules are applied or a request for re-classification by the LLM is made. In some aspects, the additional rules or LLM request step 350 may involve applying additional rules or criteria to classify the document, or sending a query to the LLM to classify the document and identify the indicators in the document that justify the classification.

It is to be understood that the steps depicted in the process 340 are merely illustrative and variations to these steps are possible. For example, the evidence retrieval step 342, majority decision check step 344, document flagging step 348, and additional rules or LLM request step 350 may be performed in various orders, concurrently, or in a loop, depending on the specific requirements of the document classification system. Furthermore, the evidence retrieval step 342 may involve different methods of retrieving evidence, the majority decision check step 344 may involve different methods of checking for a majority decision, the document flagging step 348 may involve different methods of flagging a document, and the additional rules or LLM request step 350 may involve different methods of applying additional rules or requesting re-classification by the LLM, depending on the specific implementation of the system.

Figure 3D:
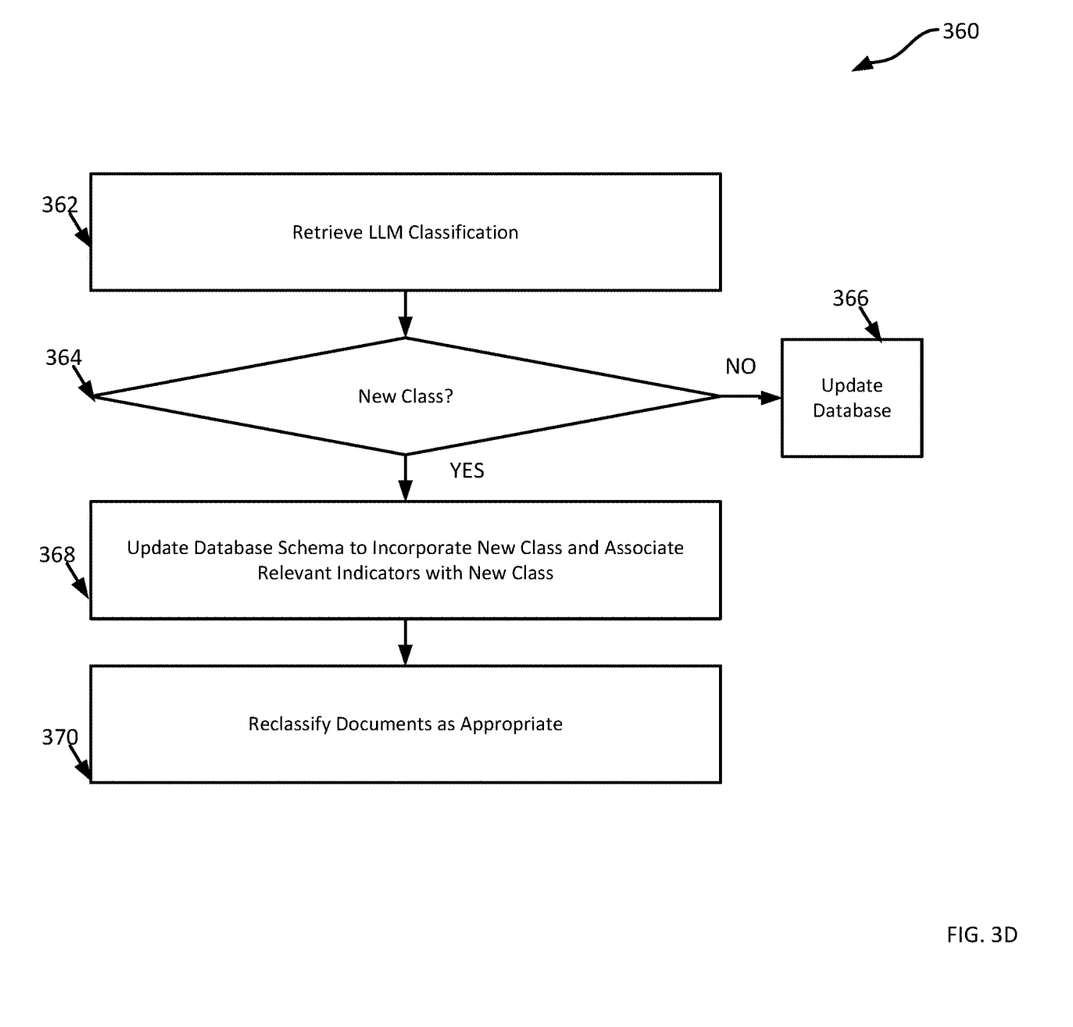
FIG. 3D depicts an example process for updating document classification in response to new class discovery, according to aspects of the present disclosure.

Referring to FIG. 3D, a flowchart outlines an example process 360 for updating document classification in response to new class discovery. The process 360 begins with an LLM classification retrieval step 362, where a classification is retrieved from a LLM. In some aspects, the LLM classification retrieval step 362 may involve sending a query to the LLM to classify a document and identify the indicators in the document that justify the classification. The query may be in the form of a natural language prompt listing the identity of the new document and a list of possible classifications. This allows the LLM to understand the context of the document and make an informed decision about its classification.

A new class decision step 364 determines whether the classification corresponds to a new class not previously recognized. In some cases, the new class decision step 364 may involve comparing the classification with a list of known classes stored in the database. If the classification corresponds to a known class (i.e., a No at step 364), the process proceeds to a database update step 366, where the existing database is updated with the information. In some aspects, the database update step 366 may involve adding the document, along with the classification and the indicators, to the database. This enriches the database with new information, which can be used for future document classification tasks.

If a new class is identified in the new class decision step 364 (i.e., a Yes at step 364), the process 360 moves to a database schema update step 368 to incorporate the new class and associate relevant indicators with the new class. In some cases, the database schema update step 368 may involve modifying the schema of the database to include a new table or a new column for the new class. The relevant indicators associated with the new class may be added to the database, which can be used for classifying future documents that contain these indicators.

The process 360 concludes with an indicator-based document classification step 370, where documents are reclassified as appropriate based on the updated database information. In some aspects, the indicator-based document classification step 370 may involve querying the database for each indicator in the document, collecting the classification results associated with each indicator, counting the frequency of each classification, and determining the majority classification based on the counted frequencies. This allows for efficient classification of documents based on the updated database information.

It is to be understood that the steps depicted in the process 360 are merely illustrative and variations to these steps are possible. For example, the LLM classification retrieval step 362, new class decision step 364, database update step 366, database schema update step 368, and indicator-based document classification step 370 may be performed in various orders, concurrently, or in a loop, depending on the specific requirements of the document classification system. Furthermore, the LLM classification retrieval step 362 may involve different types of queries, the new class decision step 364 may involve different methods of determining whether a new class has been identified, the database update step 366 may involve different types of database operations, the database schema update step 368 may involve different methods of updating the database schema, and the indicator-based document classification step 370 may involve different methods of classifying documents based on the updated database information, depending on the specific implementation of the system.

In one example, the disclosed system and methods may be applicable to classifying logs of computer activity from users of an application. These logs often contain valuable information about user behavior, which can be classified to identify and address potential issues. For instance, the system and methods can classify user problems such as invalid login credentials, unauthorized access behavior, and other examples of user behavior. By identifying and classifying these behaviors, the system can provide valuable insights for improving user experience, enhancing security measures (e.g., responding to problems), and optimizing application performance. The smart caching mechanism and the database of indicators can efficiently classify these logs by checking for indicators in the cache and the database and applying a majority vote based on the classifications associated with these indicators, thereby reducing the computational cost and time associated with LLM calls. This makes the system particularly suitable for managing large volumes of log data, which is common in many application environments.

Consider a scenario where the system is tasked with classifying logs of user activity from an application. One common issue that may arise in these logs is invalid login credentials. When a user attempts to log in with incorrect credentials, the application generates a log entry, typically containing a phrase such as "Invalid username or password". This phrase serves as an indicator for the classification of the log entry. When the system encounters a new log entry, it first checks its cache for an exact match. If no match is found, the system and methods identify the indicators in the log entry, in this case, the phrase "Invalid username or password". The system and methods query the database for these indicators, as depicted in the indicator query process step 302 in FIG. 3A. The system and methods collect the classification results associated with these indicators (classification results collection step 304) and counts the frequency of each classification (classification frequency counter step 306). The system and methods then apply a majority vote based on these frequencies to determine the classification (majority classification determination step 308). In this case, the majority of the indicators point towards the "Invalid Login Credentials" class, so the system classifies the log entry as such.

Now, consider a different scenario where the system encounters a log entry with a phrase that does not match any known indicators in the cache or the database. For instance, the log entry might contain a phrase like "User attempted to access restricted settings". This phrase does not match any known indicators for known classes, such as "Invalid Login Credentials" or "Unauthorized Access". In this case, the system and methods may follow the process outlined in FIG. 3C. After the evidence retrieval step 342 and the majority decision check step 344, the system finds that there is no clear majority decision. The system and methods flag the document in the document flagging step 348. Since the system and methods cannot classify the log entry based on the known indicators, they may apply additional rules or requests the LLM for reclassification in step 350. The LLM analyzes the log entry and returns a classification based on the process in FIG. 3D. The system and methods may also update its cache and database with this new classification and associated indicators, as depicted in FIG. 3B, to improve future classifications.

The modules described herein (e.g., classification module, LLM module, etc.) may be implemented as software components executed by the respective devices within the document classification system. The user interface device 102, user application server 104, document storage database 106, classifier database 108, and the large language model server 110 operate by executing software instructions that embody the functionalities of the classification system. These software modules are responsible for carrying out the various steps of the classification process, including but not limited to, indicator identification, caching of classifications, database querying, and application of majority voting for document classification. The software-driven nature of these modules allows for a flexible and scalable system that can be updated or modified to meet evolving classification requirements or to incorporate new technologies as they become available.

Figure 4:
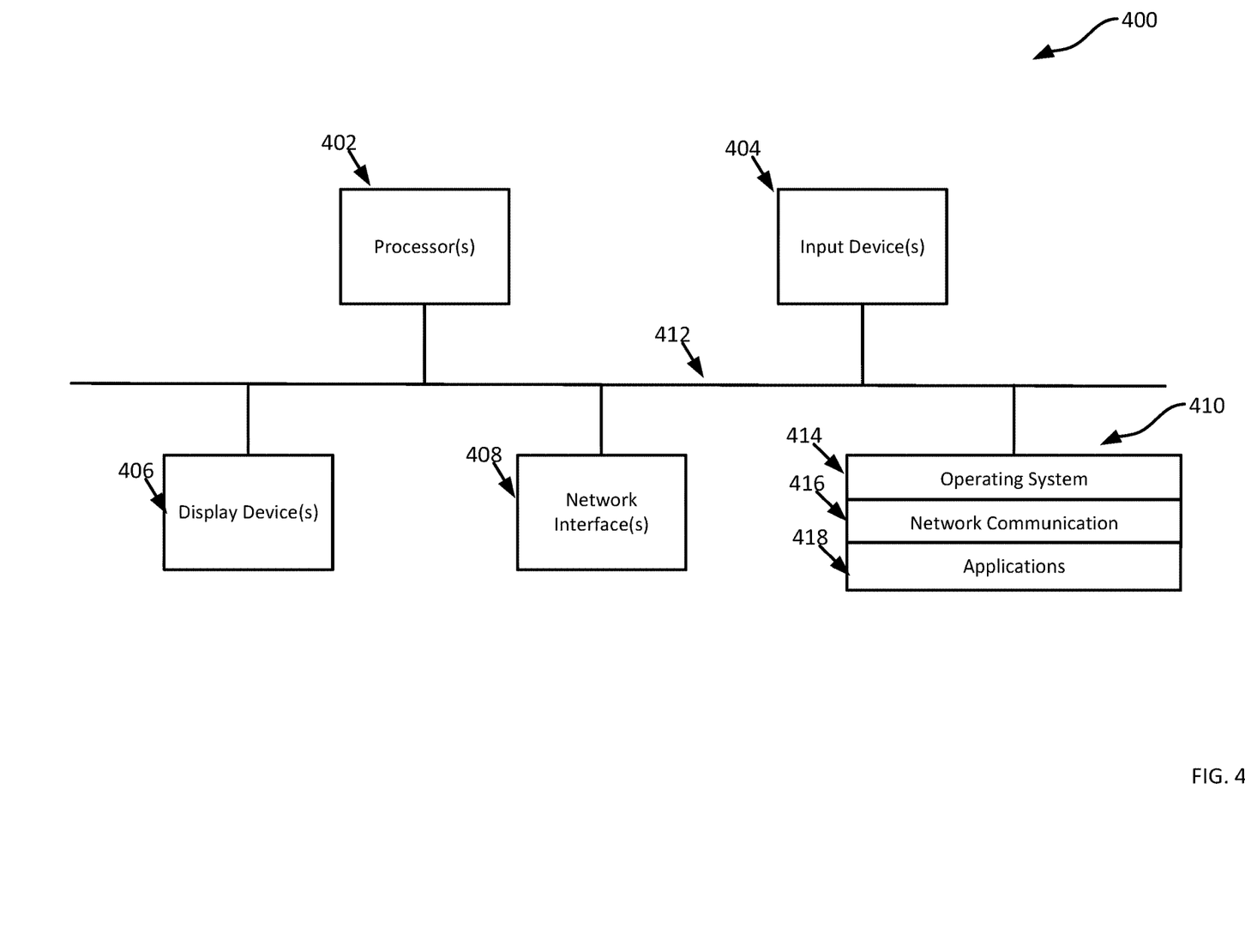
FIG. 4 depicts a block diagram of example hardware of the user device, servers and databases, according to aspects of the present disclosure.

Referring to FIG. 4, a block diagram of a computing system 400 is depicted. The computing system 400 may represent example hardware of the user device, servers, and databases shown in FIG. 1. In some aspects, the computing system 400 may be a server, a desktop computer, a laptop computer, a tablet computer, a smartphone, or any other type of computing device capable of processing and storing data.

The computing system 400 comprises a processor unit 402 that serves as the central processing unit of the system. The processor unit 402 may be responsible for managing computations and logic operations. In some cases, the processor unit 402 may be a single-core processor, a multi-core processor, or a combination of processors working together.

An input peripheral 404 is connected to the processor unit 402, allowing user inputs to be received and processed. In some aspects, the input peripheral 404 may be a keyboard, a mouse, a touch screen, a microphone, a camera, or any other type of input device. The input peripheral 404 may allow a user to interact with the computing system 400, inputting data or commands.

A display component 406 is also connected to the processor unit 402, enabling visual output to be presented to the user. In some cases, the display component 406 may be a monitor, a screen, a projector, or any other type of display device. The display component 406 may allow the user to view data, documents, or user interfaces.

The networking component 408 facilitates network connectivity, allowing the computing system 400 to communicate with other systems and devices over a network. In some aspects, the networking component 408 may be a network interface card, a wireless network adapter, or any other type of network connectivity device. The networking component 408 may allow the computing system 400 to connect to a local area network (LAN), a wide area network (WAN), the Internet, or any other type of network.

The system communication bus 412 interconnects all the hardware components, providing a pathway for data exchange within the computing system 400. In some cases, the system communication bus 412 may be a data bus, an address bus, a control bus, or any other type of bus that facilitates communication between the components of the computing system 400.

Software components 410, which include operating system software 414, network communication software 416, and application software 418, are integral to the functioning of the computing system 400. The operating system software 414 manages hardware resources and provides services for other software. The network communication software 416 facilitates communication between the computing system 400 and other systems or devices over a network. The application software 418 provides various functionalities, such as document classification, data storage, and user interface management.

It is to be understood that the components of the computing system 400 as depicted in FIG. 4 are merely illustrative and variations to these components are possible. For example, the processor unit 402, input peripheral 404, display component 406, networking component 408, system communication bus 412, and software components 410 may be implemented in various configurations and using various technologies, depending on the specific requirements of the document classification system.

While the foregoing is directed to example embodiments described herein, other and further example embodiments may be devised without departing from the basic scope thereof. For example, aspects of the present disclosure may be implemented in hardware or software or a combination of hardware and software. One example embodiment described herein may be implemented as a program product for use with a computer system. The program(s) of the program product defines functions of the example embodiments (including the methods described herein) and may be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid-state random-access memory) on which alterable information is stored. Such computer-readable storage media, when carrying computer-readable instructions that direct the functions of the disclosed example embodiments, are example embodiments of the present disclosure.

It will be appreciated by those skilled in the art that the preceding examples are example and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A document classification system, comprising:
   a large language model (LLM) configured to classify documents by identifying indicators in the documents;
   a smart caching mechanism configured to store classifications of documents and associated indicators from the LLM;
   a database containing document details, classifications, and associated indicators; and
   a classification module configured to classify a new document by analyzing the new document for indicators and checking for a match in the cache based on the indicators, querying the database for the indicators when no match for the new document is found in the cache, and applying a majority vote based on the classifications associated with the indicators.

2. The document classification system of claim 1, wherein the LLM is a transformer-based model.

3. The document classification system of claim 1, wherein the smart caching mechanism is configured to store the classifications of the documents and the associated indicators in a hash table.

4. The document classification system of claim 1, wherein the database is a relational database management system (RDBMS).

5. The document classification system of claim 1, wherein the classification module is further configured to:
   classify the new document by checking for at least one of a partial match, a semantic match, or a syntactic match in the cache;
   identify the indicators in the new document based on the match;
   query the database for the indicators; and
   apply a majority vote based on the classifications associated with the indicators.

6. The document classification system of claim 1, wherein the classification module is further configured to:
   query the database for each indicator in the new document;
   collect classification results associated with each indicator;
   count a frequency of each classification; and
   determine the majority classification based on the counted frequencies.

7. The document classification system of claim 1, wherein the classification module is further configured to:
   determine a majority decision from a list of potential classifications, and
   query the LLM for classification of the new document if there is a tie in the majority decision.

8. The document classification system of claim 1, wherein the classification module is further configured to determine whether the classification corresponds to a new class of document not previously recognized, and update a database schema to incorporate the new class and associate relevant indicators with the new class.

9. The document classification system of claim 1, wherein the classification module is further configured to perform a substring check for each sentence in the new document against the database, and add the classification of the document to a list of potential classifications for the new document when a sentence from the new document is a substring of a document in the database.

10. The document classification system of claim 1, wherein the classification module is further configured to query the LLM for a classification using a natural language prompt listing an identity of the new document and a list of possible classifications.

11. A document classification method, comprising:
   classifying, by a large language model (LLM), documents by identifying indicators in the documents;
   storing, by a smart caching mechanism, classifications of documents and associated indicators from the LLM;
   storing, by a database, document details, classifications, and associated indicators; and
   classifying, by a classification module, a new document by analyzing the new document for the indicators and checking for a match in the cache based on the indicators, querying the database for the indicators when no match for the new document is found in the cache, and applying a majority vote based on the classifications associated with the indicators.

12. The document classification method of claim 11, wherein the LLM is a transformer-based model.

13. The document classification method of claim 11, further comprising:
   storing, by the smart caching mechanism, the classifications of the documents and the associated indicators in a hash table.

14. The document classification method of claim 11, wherein the database is a relational database management system (RDBMS).

15. The document classification method of claim 11, further comprising:
   classifying, by the classification module, the new document by:
      checking for at least one of a partial match, a semantic match, or a syntactic match in the cache;
      identifying the indicators in the new document based on the match;
      querying the database for the indicators; and
      applying the majority vote based on the classifications associated with the indicators.

16. The document classification method of claim 11, further comprising:
   querying, by the classification module, in the database for each indicator in the new document;
   collecting, by the classification module, classification results associated with each indicator;
   counting, by the classification module, a frequency of each classification; and
   determining, by the classification module, a majority classification based on the counted frequencies.

17. The document classification method of claim 11, further comprising:
   determining, by the classification module, a majority decision from a list of potential classifications, and
   querying the LLM for classification of the new document if there is a tie in the majority decision.

18. The document classification method of claim 11, further comprising:
   determining, by the classification module, whether the classification corresponds to a new class of document not previously recognized; and
   updating a database schema to incorporate the new class and associate relevant indicators with the new class.

19. The document classification method of claim 11, further comprising:
   performing, by the classification module, a substring check for each sentence in the new document against the database; and
   adding the classification of the document to a list of potential classifications for the new document when a sentence from the new document is a substring of a document in the database.

20. The document classification method of claim 11, further comprising:
   querying, by the classification module, the LLM for a classification using a natural language prompt listing an identity of the new document and a list of possible classifications.

* * * * *